(12) United States Patent
Jerebko et al.

(10) Patent No.: US 7,634,133 B2
(45) Date of Patent: Dec. 15, 2009

(54) SEGMENTATION OF STRUCTURES BASED ON CURVATURE SLOPE

(75) Inventors: Anna Jerebko, West Chester, PA (US); Luca Bogoni, Philadelphia, PA (US); Sarang Lakare, Malvern, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1017 days.

(21) Appl. No.: 11/070,359

(22) Filed: Mar. 2, 2005

(65) Prior Publication Data

US 2005/0196041 A1 Sep. 8, 2005

Related U.S. Application Data

(60) Provisional application No. 60/550,045, filed on Mar. 4, 2004.

(51) Int. Cl.
G06K 9/34 (2006.01)
(52) U.S. Cl. .................. 382/173; 382/128; 382/154; 382/131; 382/132; 382/203
(58) Field of Classification Search .......... 382/100, 382/128, 131, 132, 133, 173, 190, 154
See application file for complete search history.

(56) References Cited

U.S. PATENT DOCUMENTS

| | | | |
|---|---|---|---|
| 5,151,856 A * | 9/1992 | Halmann et al. ............ | 600/508 |
| 6,213,605 B1 * | 4/2001 | D'Souza et al. ............ | 351/212 |
| 6,745,066 B1 * | 6/2004 | Lin et al. .................... | 600/425 |
| 7,020,578 B2 * | 3/2006 | Sorensen et al. ........... | 702/181 |
| 7,379,572 B2 * | 5/2008 | Yoshida et al. ............. | 382/128 |

FOREIGN PATENT DOCUMENTS

| WO | 01/78005 A2 | 10/2001 |
|---|---|---|
| WO | 03/034176 A2 | 4/2003 |

OTHER PUBLICATIONS

Yoshida H et al, "Three-Dimensional Computer-Aided Diagnosis Scheme for Detection of Colonic Polyps", *IEEE Transactions on Medical Imaging*, IEEE Inc., New York, US, vol. 20, No. 12, Dec. 2001, pp. 1261-1274.
Jerebko Anna K et al, "Computer-Assisted Detection of Colonic Polyps with CT Colonography Using Neural Networks and Binary Classification Trees", *Medical Physics*, American Institute of Physics, New York, US, vol. 30, No. 1, Jan. 2003, pp. 52-60.
Jerebko Anna K et al, "Polyp Segmentation Method for CT Colonography Computer-Aided Detection", *Proceedings of the SPIE*, SPIE, Bellingham, VA, US, vol. 5031,2003, pp. 359-369.
Besl Paul J et al, "Segmentation Through Variable-Order Surface Fitting", *IEEE Transactions on Pattern Analysis and Machine Intelligence*, IEEE Inc., New York, US, vol. 10, No. 2, Mar. 1998, pp. 167-192.
Search Report including Notification of Transmittal of the International Search Report, International Search Report, and Written Opinion of the International Searching Authority.

* cited by examiner

*Primary Examiner*—Vikkram Bali
*Assistant Examiner*—Ali Bayat

(57) ABSTRACT

A system and method for segmentation of structures in an image based on curvature slope are provided, the system including a processor, a curvature slope unit in signal communication with the processor for computing curvature slopes in the image and discarding voxels having a slope not satisfying specifications, and a segmentation unit in signal communication with the processor for locating connected clusters of retained voxels; and the method including computing curvature slopes in the image, discarding voxels having a slope not satisfying specifications, and locating connected clusters of retained voxels.

20 Claims, 4 Drawing Sheets

SEGMENTATION OF STRUCTURES BASED ON CURVATURE SLOPE

CROSS-REFERENCE TO RELATED APPLICATION

This application claims the benefit of U.S. Provisional Application Ser. No. 60/550,045, filed Mar. 4, 2004 and entitled "Segmentation of Structures Based on Curvature Slope", which is incorporated herein by reference in its entirety.

BACKGROUND

The ability to segment structures that protrude or depress from a surface is desirable in computer vision and medical applications. Such an ability is attained relatively easily for man-made objects when the structures to be segmented have strong geometrical definition. This is because such structures with strong geometrical definition can be easily approximated using geometric primitives. Unfortunately, in more natural settings such as anatomical surfaces, for example, approximations using geometric primitives may not be applicable, and image noise may become a large factor in the segmentation process.

Computer aided design and computer vision literature has many instances of approaches aimed at recovering parametric descriptions of surfaces based on the analysis of the residual of fitting multiple parametric surfaces or volumes. Other approaches may use curvature to identify the loci where the Mean or the Gaussian curvature indicate a peak.

Accordingly, it is desirable to provide a segmentation approach applicable to natural settings such as medical and non-medical images in the presence of surface noise.

SUMMARY

These and other drawbacks and disadvantages of the prior art are addressed by an exemplary system and method for segmentation of structures based on curvature slope.

An exemplary system for segmentation of structures based on curvature slope includes a processor, a curvature slope unit in signal communication with the processor for computing curvature slopes in the image and discarding voxels having a slope not satisfying specifications, and a segmentation unit in signal communication with the processor for locating connected clusters of retained voxels.

An exemplary method for segmentation of structures based on curvature slope includes computing curvature slopes in the image, discarding voxels having a slope not satisfying specifications, and locating connected clusters of retained voxels. These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for segmentation of structures based on curvature slope in accordance with the following exemplary figures, in which.

DETAILED DESCRIPTION OF PREFERRED EMBODIMENTS

Embodiments of the present disclosure systematically explore the complete surface to identify loci and associated neighborhoods, which are characterized by a transition in slope. For each location, a concentric neighborhood may be grown. For each concentric ring in the neighborhood, the average curvature is computed, which makes it robust to noise. The curvature slope for each surface voxel is then computed across the average of the curvatures for each ring surrounding the current voxel. Locations that give rise to slopes that satisfy a given threshold become candidates.

In the context of segmentation of structures, under ideal conditions, a unique maximum or minimum is located-and the associated region or collection of rings that satisfies the slope threshold conditions characterizes the surface of the structure to be segmented. The volume under the surface can easily be captured, and is bounded below or above by an interpolated surface.

Figure 1:
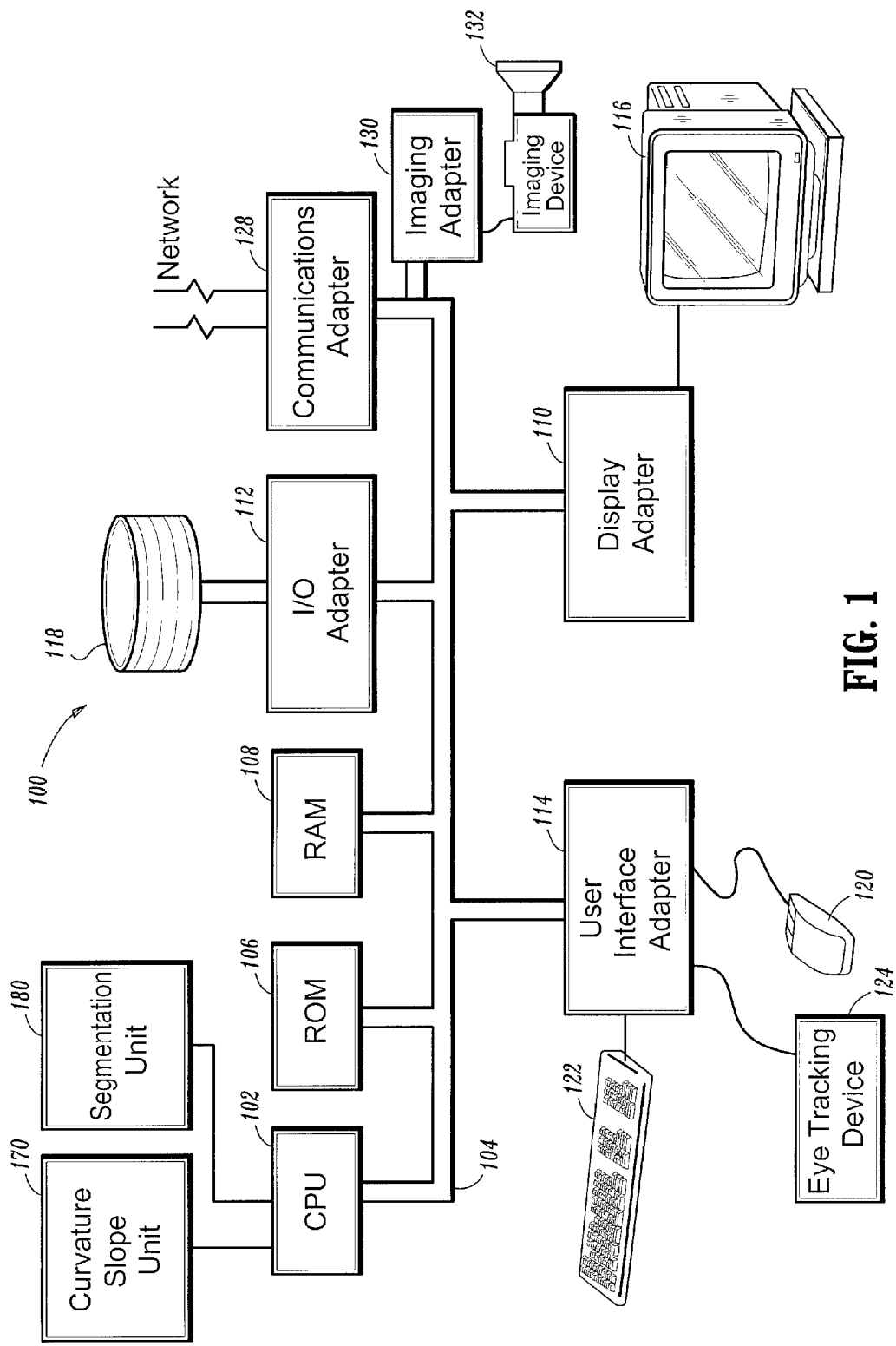
FIG. 1 shows a schematic diagram of a system for segmentation of structures based on curvature slope in accordance with an illustrative embodiment of the present disclosure.

As shown in FIG. 1, a system for segmentation of structures based on curvature slope, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104.

A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A curvature slope unit 170 and a segmentation unit 180 are also included in the system 100 and in signal communication with the CPU 102 and the system bus 104. While the curvature slope unit 170 and the segmentation unit 180 are illustrated as coupled to the at least one processor or CPU 102, these components are preferably embodied in computer program code stored in at least one of the memories 106, 108 and 118, wherein the computer program code is executed by the CPU 102.

Figure 2:
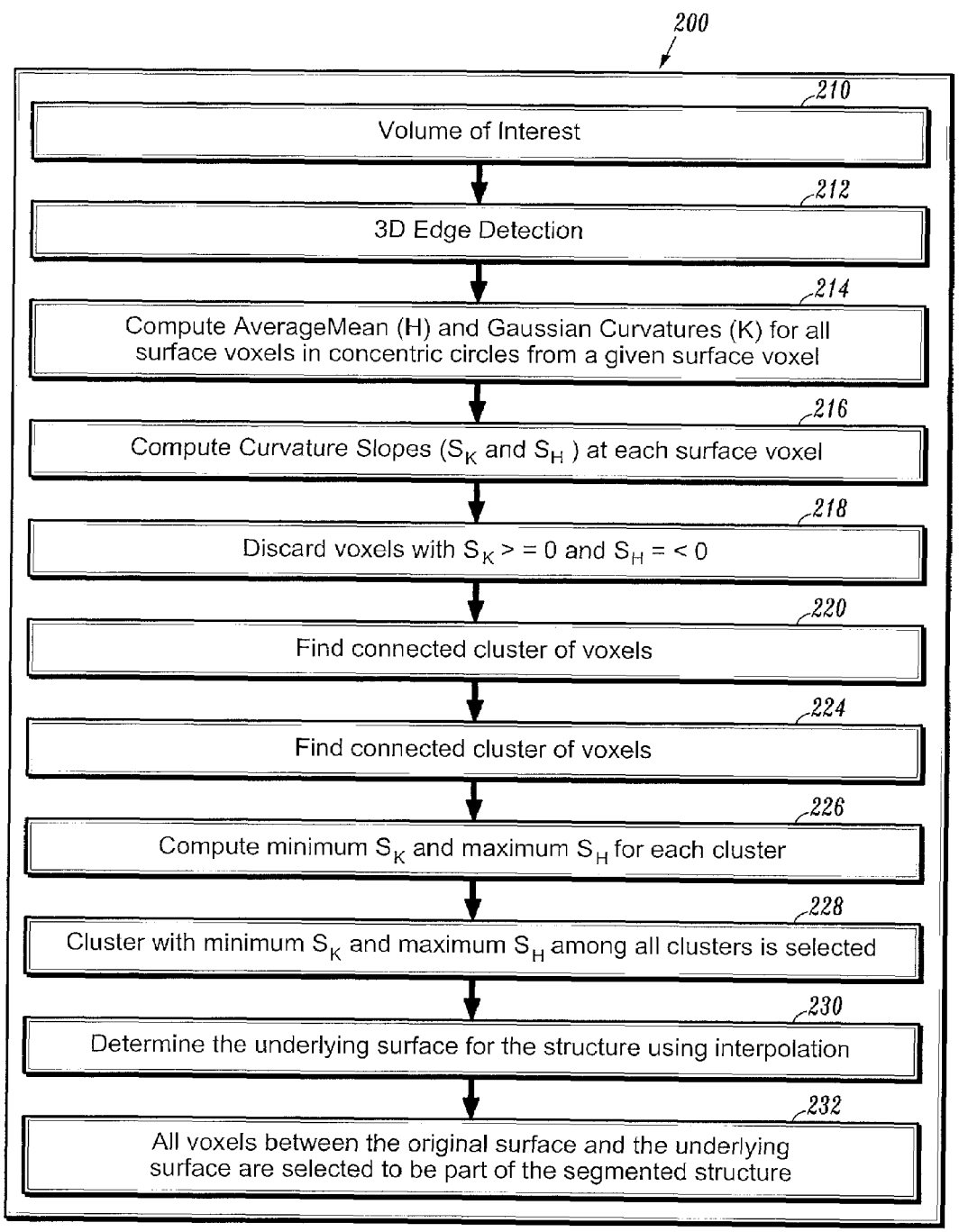
FIG. 2 shows a flow diagram of a method for segmentation of structures based on curvature slope in accordance with an illustrative embodiment of the present disclosure.

Turning to FIG. 2, a method for segmentation of structures based on curvature slope is indicated generally by the reference numeral 200. The method 200 includes a function block 210 for acquiring a volume of interest, which passes control to a function block 212 for detecting three-dimensional edges. The block 212 passes control to a function block 214, which computes Mean and Gaussian curvatures for all surface voxels in concentric rings (or bands) from a given surface voxel. The block 214 passes control to a function block 216, which computes curvature slopes at each surface voxel. The block 216, in turn, passes control to a function block 218. The function block 218 discards voxels with a Gaussian curvature slope not less than zero and an Mean curvature slope not greater than zero, and passes control to a function block 220.

The function block 220 finds a first connected cluster of voxels, and passes control to a function block 224. The function block 224 finds a connected cluster of voxels if one exists, and passes control to a function block 226. The function block 226, in turn, computes a minimum Gaussian curvature slope and a maximum Mean curvature slope for each cluster, and passes control to a function block 228. The function block 228 selects the cluster having the minimum Gaussian curvature slope and the maximum Mean curvature slope among all of the clusters, and passes control to a function block 230. The function block 230 determines the underlying surface for the structure using interpolation, and passes control to a function block 232. The function block 232, in turn, selects all voxels between the original surface and the underlying surface to be part of the segmented structure.

Figure 3:
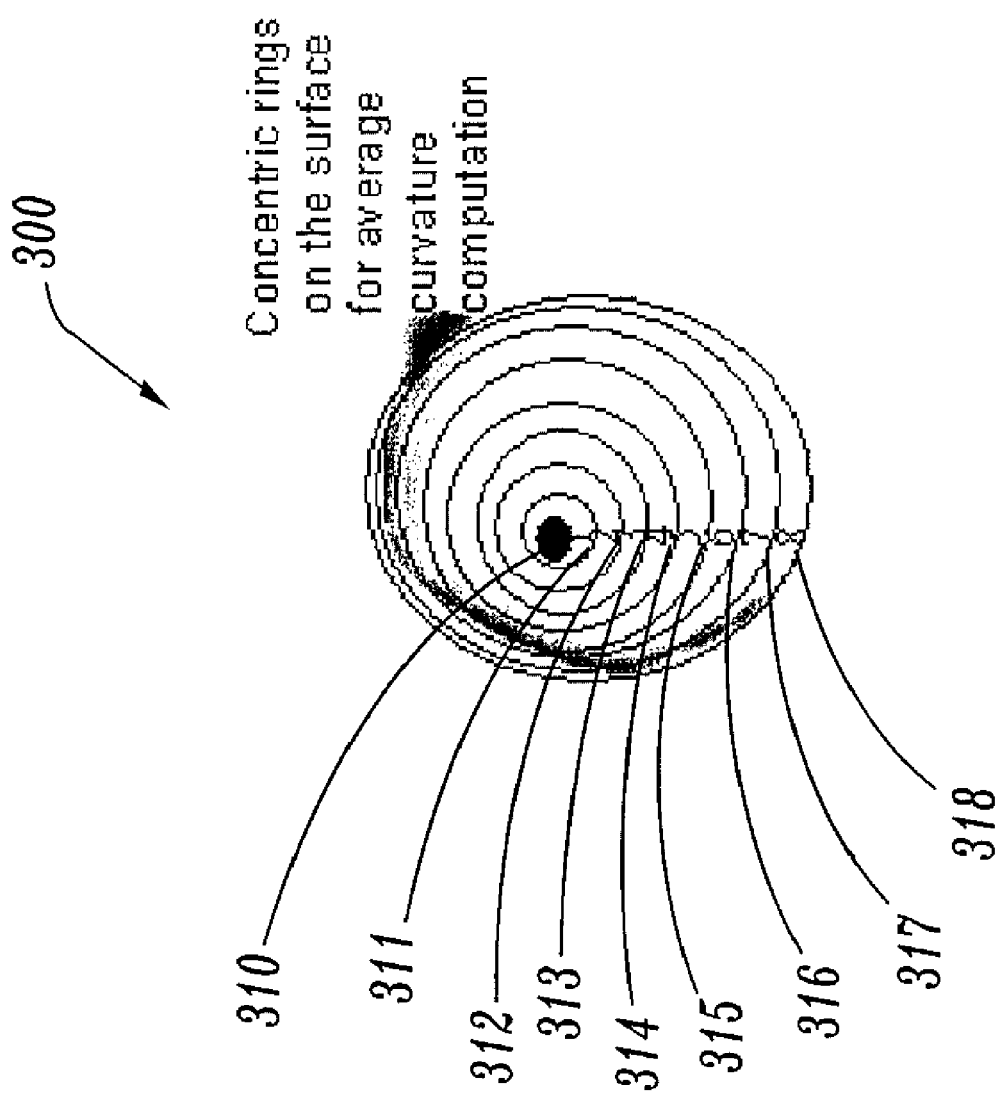
FIG. 3 shows a schematic diagram of concentric rings relative to the apex of a protruding structure in accordance with an illustrative embodiment of the present disclosure.

Turning now to FIG. 3, a protruding structure is indicated generally by the reference numeral 300. The structure has an apex 310, and concentric rings 311 through 318 relative to the apex. The concentric rings 311 through 318 are located on the surface of the structure for the computation of average curvature.

Figure 4:
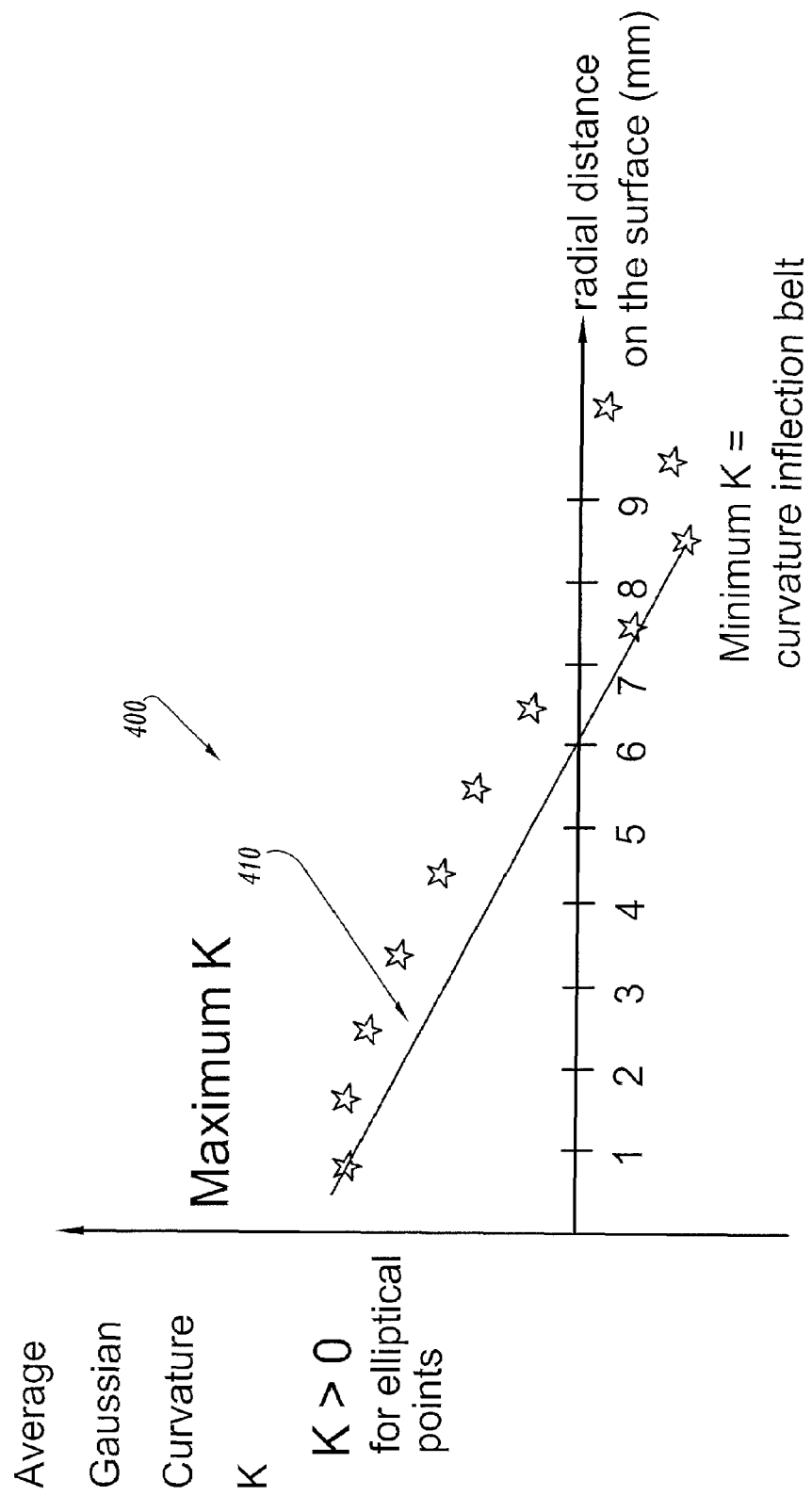
FIG. 4 shows a schematic diagram of transition curvature across the rings of FIG. 3 in accordance with an illustrative embodiment of the present disclosure.

As shown in FIG. 4, a plot of curvatures for the protruding structure 300 of FIG. 3 is indicated generally by the reference numeral 400. The plot 400 has average Gaussian curvature plotted on the vertical axis, and radial distance from the apex or central point to the surface points plotted on the horizontal axis. The slope between the curvature value at the central point and the curvature value at the inflection belt is indicated by the reference numeral 410. Thus, the transition of curvature across the various rings from the peak down to the base of the structure is plotted. The change in curvature identifies the border where the structure progressively fades into the base to which it is connected at the curvature inflection belt.

In operation, embodiments of the present disclosure recognize that a structure that protrudes from or depresses into a surface undergoes a curvature transition at a transition-belt from the highest or lowest point of its protrusion or depression to the surface at the base from where it is extending or depressing. Embodiments further recognize that the values of the computed curvature change throughout the surface of the protruding or depressing structure across the transition border area. This change can be approximated and characterized by the slope of the curvature. In addition, embodiments recognize that the surface and the underlying volume or cluster that are associated with the locus of the maximum can be characterized as the structure to be segmented. In cases of depressions, the area depression can be characterized as a negative volume.

In some cases, asymmetries or the presence of multiple protrusions or depressions in the structure may call for an iterative approach to capture adjacent portions. An automated or interactive approach is applied to grow or expand the basic structure to encompass adjacent ones or smaller subparts that are logically or spatially related.

Thus, embodiments of the present disclosure allow for locking into structures and automatically detecting them based on the surface geometry, including depressions as well as protrusions, as a means for automatically locating the structures. This capability is particularly valuable when paired with an interactive or automatic step that identifies a region or volume in which to perform the segmentation.

Operation of an exemplary method embodiment addressing the application of FIG. 3 includes the following enumerated steps:

1. 3D edge detection is applied to a volume of interest to find the surface voxels. A Canny edge detector as well as other edge detection methods, gradients or thresholding may be used for this purpose. The surface may be pre-processed to smooth out surface imperfections.

2. In each surface voxel, Mean (H) and Gaussian Curvatures (K) are calculated. A variety of methods may be used to obtain curvatures. For example, for a gray-scale image I (x, y, z), Gaussian (K) and mean (H) curvatures can be computed from Equations 1 and 2:

$$K = \frac{1}{h^2} \begin{bmatrix} I_x^2(I_{yy}I_{zz} - I_{yz}^2) + 2I_yI_z(I_{xz}I_{xy} - I_{xx}I_{yz}) + \\ I_y^2(I_{xx}I_{zz} - I_{xz}^2) + 2I_xI_z(I_{yz}I_{xy} - I_{yy}I_{xz}) + \\ I_z^2(I_{xx}I_{yy} - I_{xy}^2) + 2I_xI_y(I_{xz}I_{yz} - I_{zz}I_{xy}) \end{bmatrix} \quad \text{(Eqn. 1)}$$

$$H = \frac{1}{2h^{3/2}} \begin{bmatrix} I_x^2(I_{yy} + I_{zz}) - 2I_yI_zI_{yz} + \\ I_y^2(I_{xx} + I_{zz}) - 2I_xI_zI_{xz} + \\ I_z^2(I_{xx} + I_{yy}) - 2I_xI_yI_{xy} \end{bmatrix} \quad \text{(Eqn. 2)}$$

where I (x, y, z) are vertex intensities on the surface, (x, y, z) ∈ R, R is the surface, $I_x$ indicates the partial derivative of the image data with respect to x, and $I_{xz}$ indicates the mixed partial derivative with respect to x and z, and $$h = I_x^2 + I_y^2 + I_z^2.$$

3. For each surface voxel, the average Mean (H) and Gaussian (K) Curvatures are calculated for all the neighboring surface voxels within the rings of equal geodesic distances. For example, the integer numbers could be used as distances to form the rings where the first or central ring is formed by voxels lying at the distance D up to 1 mm (D<=1 mm) from the current central voxel, the next ring combines the voxels at the distances 1 mm<D<=2 mm. Additional rings may be used for increased precision, or fewer rings may be used for coarser precision.

4. The standard deviations of Gaussian and Mean curvatures are calculated within each ring. These values are also used as criteria to reject candidates.

5. The rings having minimal Gaussian curvature ($K_{min}$) and maximum Mean curvature ($H_{max}$) are selected for protrusion detection. To detect depressions, the rings having maximum Gaussian curvature ($K_{min}$) and minimal Mean curvature ($H_{max}$) are selected.

6. K and H curvature slopes are calculated as set forth in Equations 3 and 4:

$$S_K = (K_c - K_{min})/D_{Kmin} \quad \text{(Eqn. 3)}$$

$$S_H = (H_c - H_{max})/D_{Kmax} \quad \text{(Eqn. 4)}$$

where
 $S_K$ is the Gaussian curvature slope,
 $S_H$ is the Mean curvature slope,
 $K_c$ is the Gaussian curvature in the central ring,
 $H_c$ is the Mean curvature in the central ring,
 $D_{Kmin}$ is the distance corresponding to the ring having minimal Gaussian curvature, and
 $D_{Kmax}$ is the distance corresponding to the ring having maximum Mean curvature.

7. When the central ring is located on the top of the structure protruding from the surface, the rings having minimal Gaussian curvature and maximum Mean curvature are likely to correspond to the structure's inflection belt, which is the area of transition with the surrounding surface. The voxels having negative Gaussian curvature slope and/or positive Mean curvature slope are likely to correspond to a protruding structure. Cylindrical and parabolic structures can have similar properties, but the K and H curvature standard deviations within the rings having minimal Gaussian curvature and maximum Mean curvature are significantly higher in these than in the structures with spherical or ellipsoidal symmetry. With this knowledge, a basic algorithm for protrusion detection may delete all of the surface voxels where $S_K >= 0$ and/or $S_H <= 0$ as belonging to the flat surface or pits rather than peaks. Other conditions on curvature slopes and statistical properties of the curvatures in the concentric rings may be used to remove voxels outside of the desired range in case of depression or more complex structure detection.

8. Clustering is performed on the remaining surface voxels to group them into connected clusters corresponding to segmented structures.

9. The steps 10 and 11 may be performed for each cluster of for the cluster that has properties that correspond the best the structure of interest.

10. The underlying surface separating each structure's volume from the remaining portion underneath is then determined by interpolation.

11. The voxels between the surfaces determined by a cluster and the interpolated cutting surface are considered as belonging to a structure.

Method embodiments of the present disclosure are well suited for a broad range of applications for man-made objects as well as for natural structures, and in particular, anatomical structures. For example, an embodiment has been applied for segmentation of colonic lesions. One of the major advantages in the segmentation of colonic lesions and in particular for polyps, is that the method embodiment allows both a means to segment and to differentiate between polyps and folds. Polyps have symmetry relative to the maximum while folds and elongated structures do not have a unique maximum, but more importantly have a varying slope when considered with respect to the apex.

A method embodiment may be used in conjunction with an interactive or automatic approach that identifies the area in which to perform segmentation. This method removes the variability associated with a changing specification of the location. Namely, the user or system specifies any location within the volume near, on or within the structure to be segmented. The encompassing volume and surface unambiguously include the structure to be segmented. When more than one such structure is included in the sub-volume, all of the structures may be segmented. Various methods and criteria may be employed to select the relevant structure. Proximity, peakyness, shape characteristics and size, for instance, can be used to automatically disambiguate the structure. For example, a classification approach based on a set of extracted features may be used to determine the correct structure. Alternatively, when dealing with an interactive system, the segmented structures can be proposed for user verification.

The exemplary method embodiment can also be applied for segmentation of airway lesions and other similar anatomical structures that protrude or depress into a surface or tissue. In addition, it can be applied to different modalities such as, for example, CT, MR, US, and PET. In order to apply the method in some types of data sets, the volume to be operated on may be interpolated to be rendered isotropic. Alternatively, the formulation for the computation of the derivatives and the curvatures may be corrected to account for the non-isotropic nature of the data processed.

Thus, the segmentation of structures according to embodiments of the present disclosure is not limited to anatomical structures, and is based on curvature variations across a surface. Associated portions of the surface and underlying volume, whether positive or negative, can be used to segment a structure from its surroundings. Applications in the medical domain pertain to colonic polyp segmentation as well as the characterization of diverticula or small pits in the colon wall. Embodiments can be used to segment or characterize other structures that are protruding or depressing in airways, such as polyps, small bulges or pits.

In alternate embodiments of the apparatus 100, some or all of the computer program code may be stored in registers located on the processor chip 102. In addition, various alternate configurations and implementations of the curvature slope unit 170 and the segmentation unit 180 may be made, as well as of the other elements of the system 100. In addition, the methods of the present disclosure can be performed in color or in gray level images.

Accordingly, an exemplary system embodiment for segmentation of structures based on curvature slope includes a processor, a curvature slope unit in signal communication with the processor for computing at least one of a minimum and maximum curvature slope for each of a plurality of clusters, and a segmentation unit in signal communication with the processor for selecting the cluster having the lowest minimum or highest maximum curvature slope for the segmented structure. A corresponding exemplary method embodiment for segmentation of structures based on curvature slope includes detecting edges within an image, computing curvatures for surface voxels, computing curvature slopes at the surface voxels, discarding voxels having a slope outside of a desired range or specifications, and locating connected clusters of retained voxels.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for segmentation of structures in an image based on curvature slope, the method comprising:
   detecting edges within a volume of interest (VOI);
   computing curvatures, using a processor, for surface voxels corresponding to the edges;
   computing average curvatures within concentric rings having equal geodesic distances;
   computing a curvature slope based on the average curvatures from a central ring to a peripheral ring;
   discarding voxels having a curvature slope not satisfying specifications; and
   locating connected clusters of retained voxels.

2. A method as defined in claim 1, further comprising:
   computing at least one of a minimum and maximum curvature slope for each cluster; and
   selecting the cluster having the lowest minimum or highest maximum curvature slope for the segmentation structure.

3. A method as defined in claim 2 wherein the curvature slopes are computed at the surface voxels.

4. A method as defined in claim 1 wherein the specifications for discarding voxels specify those voxels with slopes outside of a desired range.

5. A method as defined in claim 1, further comprising:
   determining an underlying surface for the connected clusters of retained voxels by interpolation; and
   selecting all voxels between surface voxels corresponding to the edges and the underlying surface to be included in the segmented structure.

6. A method as defined in claim 1 wherein computing curvatures includes computing at least one of Gaussian and Mean curvatures.

7. A method as defined in claim 1 wherein computing curvature slopes includes:
   finding the ring with minimum or maximum average curvature; and
   computing the curvature slope from the central ring to one of the peripheral rings having minimum or maximum average curvature.

8. A method as defined in claim 4 wherein the desired range of slopes for discarding voxels is bounded by zero.

9. A method as defined in claim 2 wherein selecting the cluster includes selecting the cluster having at least one of the lowest minimum Gaussian slope and the highest maximum Mean slope.

10. A system for segmentation of structures in an image based on curvature slope, the system comprising:
    a processor, wherein the processor performs the steps of:
      detecting edges within a volume of interest (VOI);
      computing curvatures for surface voxels corresponding to the edges;
      computing average curvatures within concentric rings having equal deodesic distances;
      computing a curvature slope based on the average curvatures from a central ring to a peripheral ring;
    a curvature slope unit in signal communication with the processor for computing curvature slopes in the image and discarding voxels having a slope not satisfying specifications; and
    a segmentation unit in signal communication with the processor for locating connected clusters of retained voxels.

11. A system as defined in claim 10, further comprising:
    interpolation means in signal communication with the segmentation unit for determining the underlying surface for the connected clusters of retained voxels by interpolation; and
    selection means in signal communication with the interpolation means for selecting all voxels between an original surface and the underlying surface to be included in the segmented structure.

12. A system as defined in claim 10, further comprising at least one of an imaging adapter and a communications adapter in signal communication with the processor for receiving image data.

13. A system as defined in claim 10 wherein the curvature slope unit is disposed for computing curvatures as average curvatures for all surface voxels in at least one concentric ring relative to a central surface voxel, wherein adjacent concentric rings are separated by an equal geodesic distance.

14. A system as defined in claim 10 wherein the curvature slope unit is disposed for computing curvatures as at least one of Gaussian and Mean curvatures.

15. A system as defined in claim 10 wherein the curvature slope unit is disposed for discarding voxels outside of predefined specifications.

16. A system as defined in claim 15 wherein the predefined specifications include a desired range of slopes that is bounded by zero.

17. A system as defined in claim 10 wherein the curvature slope unit is disposed for computing at least one of a minimum and maximum curvature slope for each cluster by computing at least one of a minimum Gaussian slope and a maximum Mean slope for each cluster.

18. A system as defined in claim 11 wherein the selection means is disposed for selecting the cluster having at least one of the lowest minimum Gaussian slope and the highest maximum Mean slope.

19. A computer readable medium storing a computer program to perform program steps for segmentation of structures in an image based on curvature slope, the program steps comprising:
    detecting edges within a volume of interest (VOI);
    computing curvatures for surface voxels corresponding to the edges;
    computing average curvatures within concentric rings having equal geodesic distances;
    computing a curvature slope based on the average curvatures from a central ring to a peripheral ring;
    discarding voxels having a curvature slope not satisfying specifications; and
    locating connected clusters of retained voxels.

20. A computer readable medium as defined in claim 19, the program steps further comprising at least one of:
    computing at least one of a minimum and maximum curvature slope for each cluster;
    selecting the cluster having at least one of the lowest minimum and highest maximum curvature slope for the segmentation structure;

determining an underlying surface for the segmentation structure by interpolation;
selecting all voxels between surface voxels corresponding to the edges and the underlying surface to be included in the segmented structure;

computing a minimum Gaussian slope for each cluster; and
computing a maximum Mean slope for each cluster.

* * * * *